(12) United States Patent
Brumme et al.

(10) Patent No.: US 7,647,629 B2
(45) Date of Patent: Jan. 12, 2010

(54) HOSTED CODE RUNTIME PROTECTION

(75) Inventors: Christopher W. Brumme, Mercer Island, WA (US); Sebastian Lange, Seattle, WA (US); Gregory D. Fee, Seattle, WA (US); Michael Gashler, Kirkland, WA (US); Mahesh Prakriya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1268 days.

(21) Appl. No.: 10/772,205

(22) Filed: Feb. 3, 2004

(65) Prior Publication Data

US 2005/0172286 A1  Aug. 4, 2005

(51) Int. Cl.
- *G06F 7/04* (2006.01)
- *G06F 12/00* (2006.01)
- *G06F 12/14* (2006.01)
- *G06F 13/00* (2006.01)
- *G06F 17/30* (2006.01)
- *G11C 7/00* (2006.01)

(52) U.S. Cl. ...................................................... 726/21
(58) Field of Classification Search .................... 726/21
See application file for complete search history.

(56) References Cited

U.S. PATENT DOCUMENTS

| 2002/0004815 | A1* | 1/2002 | Muhlestein et al. | 709/201 |
| 2002/0108102 | A1* | 8/2002 | Muhlestein et al. | 717/124 |
| 2003/0041267 | A1  | 2/2003 | Fee et al. | |
| 2005/0172286 | A1* | 8/2005 | Brumme et al. | 718/1 |

\* cited by examiner

*Primary Examiner*—Kambiz Zand
*Assistant Examiner*—Jason K Gee
(74) *Attorney, Agent, or Firm*—Lee & Hayes PLLC

(57) ABSTRACT

A host operating in a managed environment intercepts a call from a managed caller to a particular callee and determines whether the call is permissible according to the host's prior configuration of a plurality of callees. The particular callee, which provides access to a resource that the host can be protecting, can have been previously configured by the host to always allow the call to be made, to never allow the call to be made, or to allow the call to be made based upon the degree to which the host trusts the managed caller.

33 Claims, 7 Drawing Sheets

HOST CONFIGURATION 302

* * *  304

RESOURCE CHECKING 308

ACTIVATE 306

ALWAYS 310
RESOURCE 312 (1)
...
RESOURCE 312 (A)

NEVER 314
RESOURCE 312 (1)
...
RESOURCE 312 (B)

CONDITIONAL 316
RESOURCE 312 (1)
PD        318 (1)
...
RESOURCE 312 (C)
PD        318 (C)

* * *  320

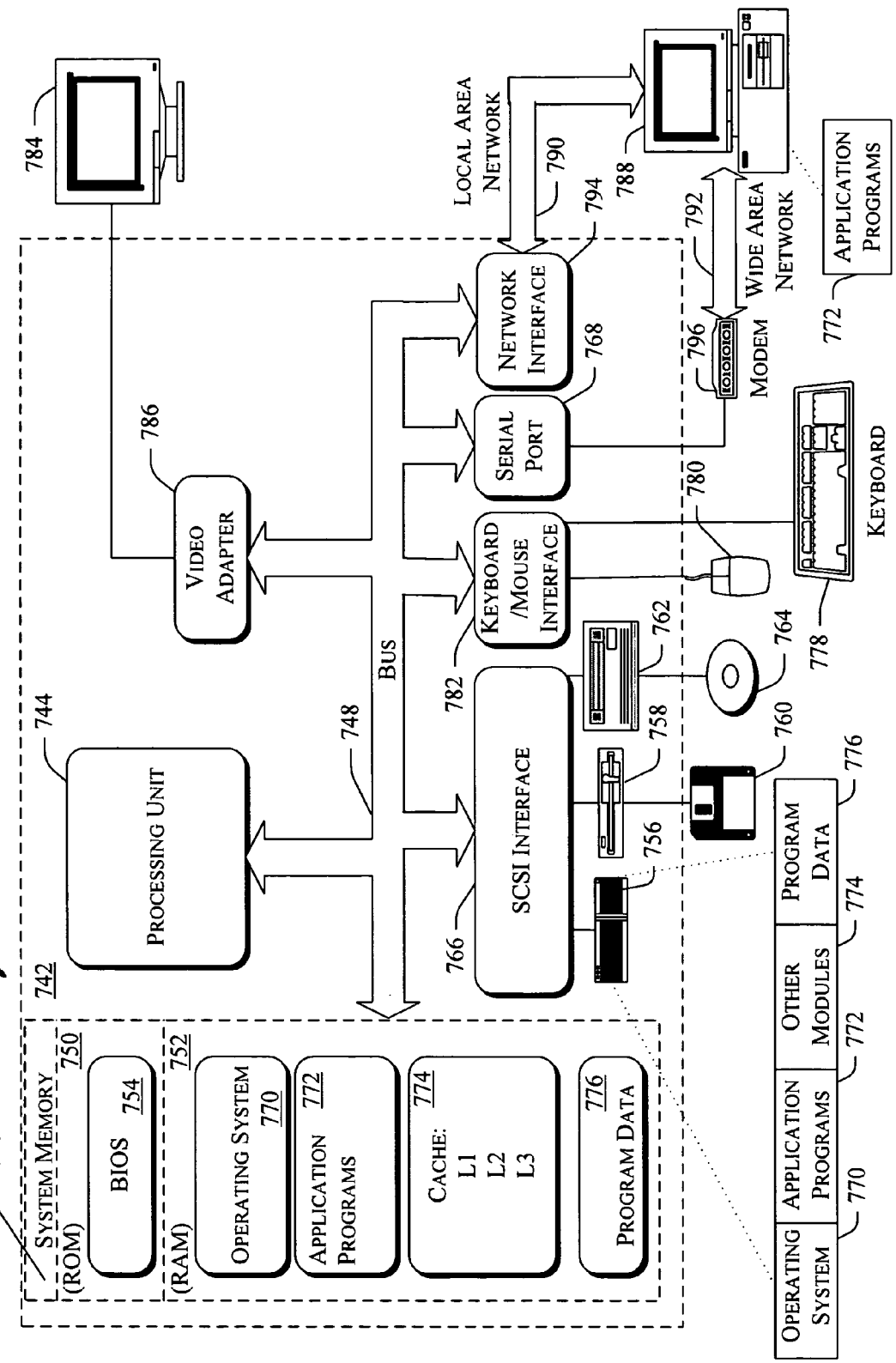

HOSTED CODE RUNTIME PROTECTION

TECHNICAL FIELD

The present invention relates generally to a managed computing environment, and more particularly to an environment where a computing device compiles managed code into native code that is executed by a common language runtime via the computing device's operating system, where the managed code environment disallows calls to managed code that are deemed inappropriate for the particular the managed code environment.

BACKGROUND

An application program interface (API) for a network platform can be used by developers to build Web applications and services. One such API is the .NET™ platform created by Microsoft Corporation of Redmond, Wash., USA. The .NET™ platform is a software platform for Web services and Web applications implemented in a distributed computing environment. The .NET™ platform allows integration of a wide range of services that can be tailored to the needs of the user. As used herein, the phrase application program interface or API includes traditional interfaces that employ method or function calls, as well as remote calls (e.g., a proxy, stub relationship) and SOAP/XML invocations. The .NET™ platform uses a framework that includes a Common Language Runtime (CLR) and base class libraries. Additional information regarding the basics of the .NET™ Framework can be found in a number of introductory texts, such as Pratt, *Introducing Microsoft .NET*, Third Edition, Microsoft Press, 2003.

The CLR is the heart of the Microsoft .NET™ Framework and provides the execution environment for all .NET™ code. Thus, code that is built to make use of the CLR, and that runs within the CLR, is referred to as "managed code." In one instance, managed code is code that is destined to run on a virtual computing platform. The virtual computing platform is a platform that 'just in time' compiles the code at runtime into the machine platform's assembly/machine code.

The CLR provides various functions and services required for program execution, including just-in-time (JIT) compilation, allocating and managing memory, enforcing type safety, exception handling, thread management and security. The CLR is loaded upon the first invocation of a .NET™ routine. Because managed code compiles to native code prior to execution, significant performance increases can be realized in some scenarios. Managed code uses Code Access Security (CAS) to prevent assemblies from performing certain operations.

When writing managed code, the deployment unit is called an assembly which is a collection of one or more files that are versioned and deployed as a unit. An assembly is the primary building block of a .NET™ Framework application. All managed types and resources are contained within an assembly and are marked either as accessible only within the assembly or as accessible from code in other assemblies.

An assembly can be packaged as a data link library (DLL) or executable (EXE) file. While an executable file can run on its own, a data link library file must be hosted in an existing application. One type of assembly can be in a shared managed library, where shared libraries are typically one specific DLL. Each such assembly in a shared managed library has one or more methods that can be called by other assemblies. For example, an assembly can call to a method in a managed shared library, where the method is for a service that is accessible on the Internet.

Within any host, or program that is hosting other managed code, access rights for calls between an assembly and a method in a library's assembly should be defined and limited via rules to prevent code from doing something that is wrong within an environment. For instance, certain code can use synchronization in a way that can cause deadlocks or an inconsistent state leading to decreased reliability and throughput. It would therefore be advantageous to provide a rule that prevents this code from synchronization to thereby avoid the consequence of decreased reliability and throughput. Another situation where a rule is desirable is in the prevention of a call from an assembly to a method that might destabilize the hosting environment. In this case, the calling assembly could be one that is provided by a developer entity that is likely to be noncompliant with sophisticated requirements of the managed environment. As such, the calling assembly might be managed code that, when executed, might render the managed code environment unreliable, or might destabilize a computing device running the hosting environment. Still another situation where a rule, or hosting rule, is desirable is to prevent an assembly from calling for access rights to a resource that is inappropriate for an application that is being hosted. For example, when a Database Management System (DBMS) is being hosted in a virtual machine environment on a server, it would be inappropriate in a server environment to permit a call from an assembly for a user interface resource.

A managed environment can typically be accommodated by different kinds of hosts, each of which may have different hosting requirements to minimize threats to robustness and reliability. It would be an advantage in the art to provide a way for a host to selectively disallow certain classes of resource access to hosted code, where the hosting requirements would not necessarily be based upon a security feature. While different kinds of hosts can have different types of hosting requirements, it would be problematic to provide a separate method to perform the same function for each different kind of host and/or for each different type of hosting requirement. Accordingly, it would be an advance in the art to provide techniques for a host to prevent a call to a certain method from a certain caller to perform a certain function that could destabilize the hosting environment, while allowing the call to the same method from a different and/or more highly trusted caller, where the techniques could use the same method for different types of call prevention and for different types of hosts.

SUMMARY

Implementations allow a host of a runtime environment to disallow a call to a method from a managed code caller when the call is deemed inappropriate according to applicable rules for the particular hosting environment. Implementations also allow a host to minimize robustness and/or reliability failures of hosted code by selectively disallowing access to resources that could cause robustness and/or reliability issues in a specific host environment. Moreover, shared library methods can be selectively disabled by a host based on that host's specific reliability and/or robustness needs. As such, different hosts may disallow different classes of resource access, such as shared state or thread manipulation, based on the specific host's reliability and/or robustness criteria for the code that the host is hosting.

BRIEF DESCRIPTION OF THE DRAWINGS

A more complete understanding of the implementations may be had by reference to the following detailed description when taken in conjunction with the accompanying drawings wherein:

FIG. 3 depicts an exemplary host configuration data structure that includes a resource checking data structure that defines hosting rules for conditionally permitting access to methods from callers.

FIG. 7 is a block diagram of an exemplary environment capable of supporting any exemplary computing device seen in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

An assembly defines a security boundary. The Common Language Runtime (CLR) implements a Code Access Security (CAS). What the CLR-based code in the assembly is allowed to do depends on the intersection of what permissions that assembly requests and what permissions are granted to that assembly that are in effect when the assembly executes. The CAS allows the CLR to limit what a particular assembly is allowed to do based on an identity of the assembly. The identity of the assembly can be the assembly's name, who published the assembly, and where the assembly came from. Implementations use the identity of the assembly and the appropriateness of the assembly's calls as criteria to control whether the assembly's calls are permitted to be made.

Exemplary Network Environment

Figure 1:
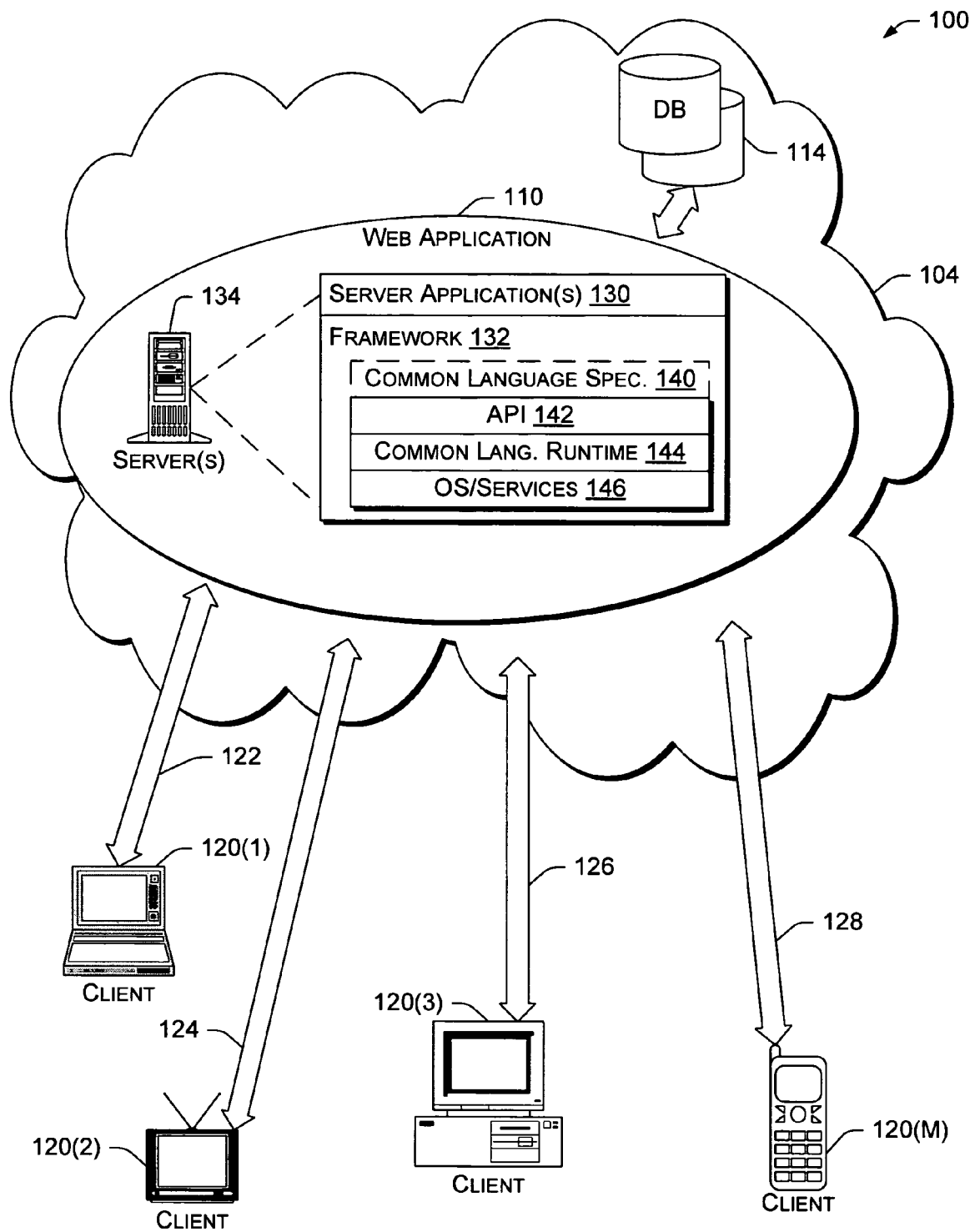
FIG. 1 illustrates a network architecture in which clients access Web services provided by one of more servers over the Internet using conventional protocols, where each server runs managed user code in a server process that can access an object-oriented database.

FIG. 1 shows a network environment 100 in which a network platform, such as the .NET™ platform, may be implemented. While the .NET™ platform is used herein for the purpose of illustration of a managed environment, those of skill in the relevant arts will readily recognize that implementations disclosed herein are applicable to other managed environments, including a Java Virtual Machine environment.

The network environment 100 includes representative Web services accessible directly by a software application, such as Web application 110. Each Web service is illustrated as including one or more servers 134 that execute software to handle requests for particular services. Such services often maintain databases 114 that store information to be served back to requesters. For instance, databases 114 can include an object-oriented database. Web services may be configured to perform any one of a variety of different services and can be combined with each other and with other applications to build intelligent interactive experiences.

The network environment 100 also includes representative client devices 120(1), 120(2), 120(3), . . . , 120(M) that utilize the Web application 110 (as represented by communication links 122-128). The client devices, referenced generally as number 120, can be implemented many different ways. Examples of possible client implementations include, without limitation, portable computers, stationary computers, tablet PCs, televisions/set-top boxes, wireless communication devices such as cellular telephones, personal digital assistants, video gaming consoles, printers, photocopiers, and other smart devices.

The Web application 110 is an application designed to run on the network platform when handling and servicing requests from clients 120. The Web application 110 is composed of one or more software applications 130 that run atop a programming framework 132, which are executing on one or more servers 134 or other computer systems. A portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages and encapsulates the underlying operating system and object model services. The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework 132. A common language specification (CLS) 140 allows designers of various languages to write code that is able to access underlying library functionality.

The API layer 142 presents groups of functions that the applications 130 can call to access the resources and services provided by layer 146. The framework 132 can be configured to support API calls placed by remote applications executing remotely from the servers 134 that host the framework 132. An application residing on client 120 can use the API functions by making calls directly, or indirectly, to the API layer 142 over the network 104. The framework 132 may also be implemented at the clients 120 identically to a server-based framework 132, or modified for the purposes of the clients 120. Alternatively, the client-based framework may be condensed in the event that the client 120 is a limited or dedicated function device, such as a cellular telephone 120(M), personal digital assistant, handheld computer, or other communication/computing device.

Computing Device Environment

Figure 2:
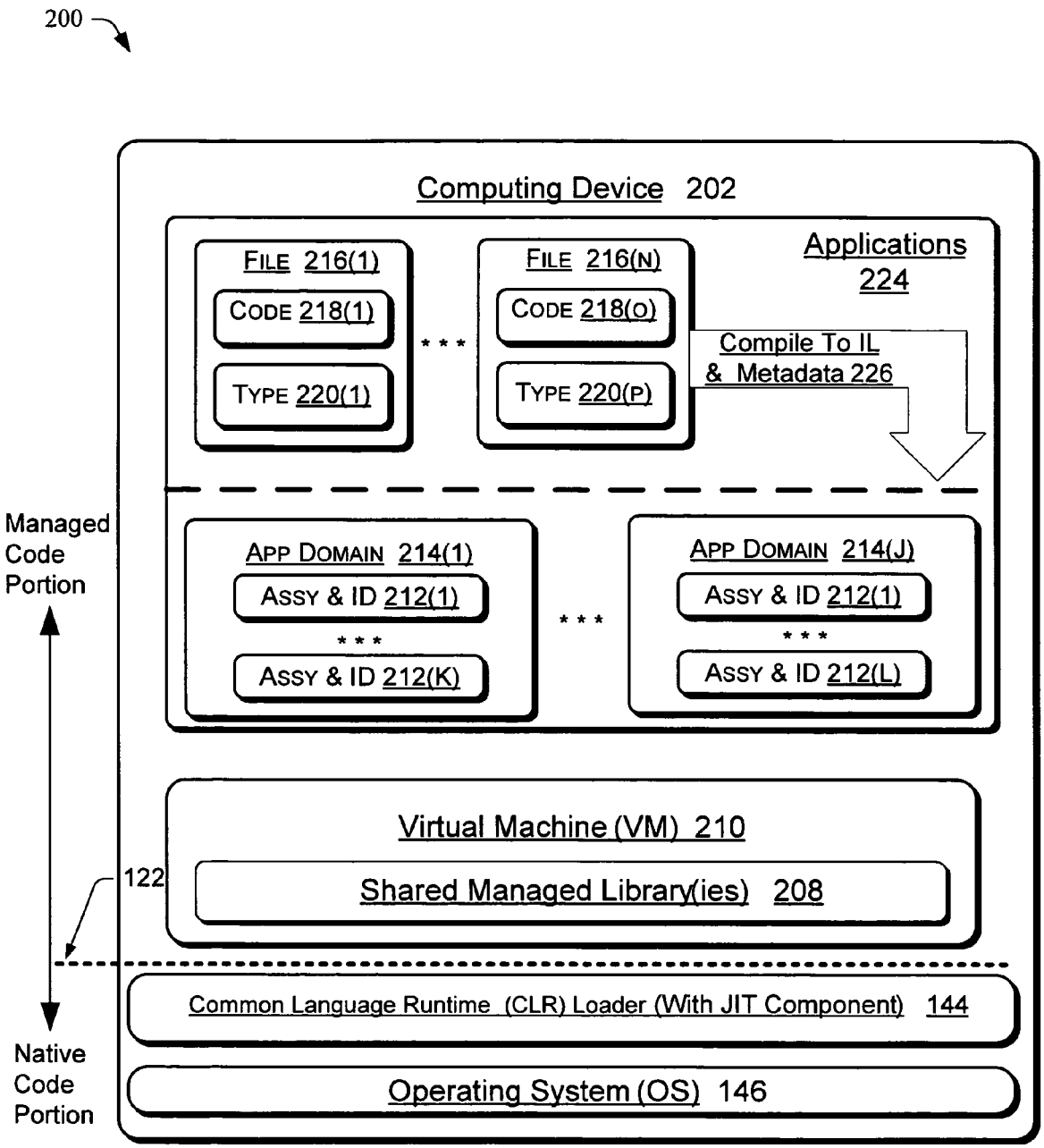
FIG. 2 illustrates an exemplary embodiment of a computing environment, one example of which can be as seen in FIG. 1, that integrates a virtual machine (VM) in a managed code portion, where the computing environment has a managed code portion that includes a shared managed library and an exemplary software compilation of files having different file types into one or more assemblies placed respectively within one or more application domains for execution, and where the computing environment has a native code portion that includes a Common Language Run Time and an operating system.

FIG. 2 shows an implementation that illustrates a computing device 202 utilizing a virtual machine (VM) 210 having architecture to run on different platforms. VM 210 is stacked on an interface 222 between a managed code portion and a native code portion. Accordingly, interface 222 can be an interface to different operating systems and different applications.

The native code portion includes operating system 146, examples of which include a UNIX based operating system such has a LINUX™ operating system, a SQL Server operating system™ provided by Sybase of Emeryville, Calif. or by Microsoft Corporation, or the Window® operating system provided by Microsoft Corporation. Over the operating system 146 is a module 144 that include a Common Language Runtime (CLR) having a CLR loader and a Just-In-Time (JIT) compiler component The managed code portion includes VM 210, one or more files 216(n), and one or more application (app) domains 214(j). Each file 216(n) has user code 218(o) that can be coded in a variety of different programming languages. As mentioned above, additional information regarding the basics of the .NET™ Framework can be found in a number of introductory texts, such as Pratt, *Introducing Microsoft .NET*, Third Edition, Microsoft Press, 2003.

FIG. 2 illustrates an exemplary arrow 226 where files 216 having different file types 220(p) are compiled into Intermediate Language (IL) and metadata contained in one or more managed assemblies (assy) 212 (1-K), (1-L) within respective app domains 214(1-J). Each assy & ID 212, which has an identification (ID), is placed into an app domain 212 before being executed. The ID of the assy & ID 212 can be, for instance, the assembly's name, who published the assembly, and where the assembly came from. Accordingly, each of the assemblies in app domain 2140) are referred to herein as assy & ID 212. The compilation 226 enables the files 216 of arbitrary (and possibly expanded/extended) types 220 to be compiled into at least one managed assy & ID 212 for placement within one app domain 214 for execution.

As illustrated, each file 216(n) is compiled and includes code 218(o) of respective type 220(p). It should be understood that each file 216(n) may not physically include its code 218(o). However, the source code for each code 218(o) is inferable or otherwise derivable from the contents of its file 216(n). Although a finite number of files 216 and types 220 are illustrated in and/or indicated by FIG. 2, any number of files 216 and types 220 may be involved in compilation 226. Compilation 226 may comprise a pluggable build architecture that interfaces with modules assigned to files 216. These modules may be tailored to the corresponding arbitrary file types 220 of files 216 in order to facilitate a compilation 226 of their code 218 into a target managed assy & ID 212 for placement within an application domain 214 for execution.

The CLR loader of component 206, which is stacked upon the computing device's operating system 146, operates in the native code portion as the execution engine for the virtual machine 210. The JIT aspect of component 206 compiles each managed assy & ID 212 (1-K), (1-L) into native code for placement within respective app domains 214(1-J) for execution by the CLR loader of component 206. Accordingly, computing device 202 provides a virtual machine 210 operating in a managed code portion for executing applications 224.

FIG. 3 illustrates an exemplary data structure 300. Data structure 300 hold a host configuration data structure 302. Host configuration data structure 302 can contain a variety of data to configure a managed environment in which managed code will be executed. These data include a variety of data structure 304-320, with a resource checking data structure 308. Resource checking data structure 308 contains data to configure hosting rules under which managed code will be allowed or disallowed from making calls to method in one or more managed shared libraries having functionality available to the managed environment. Resource checking data structure 308 is made available when the CLR 144 is started on the computing device 202. The configuration of the hosting environment using data in the resource checking data structure 308 will continue until the CLR 144 has finished running on the computing device 202. The configuration defines hosting rules for conditionally permitting access to methods from callers. The contents and arrangement of the resource checking data structure 308 are given for the purpose of an illustration of the functionality accomplished and not for the purpose of limiting the breadth of the contemplated functionality.

An activate data structure 306 contains data providing information as to whether the host will use any information in the resource checking data structure 30&. Thus, the activate data structure 306 enables or disables resource checking by the host. An always data structure 310 identifies each resource 312(a) that will always be permissible to be accessed by a managed assembly that calls a method providing access to the resource 312(a). Thus, any managed assembly that calls a method having access to the resource 312(a) will be permitted.

Another data structure 314 identifies each resource 312(b) that will never be permissible to be accessed by a managed assembly that calls a method providing access to the resource 312(b). Those resources 312(b) are subject to a hosting rule that prevents an assembly from calling to a method having access rights to any resource 312(b). Such access, for instance, can be inappropriate for an application that is being hosted. For example, when a Database Management System (DBMS) is being hosted in a virtual machine environment on a server, it would be inappropriate in a server environment to permit a call from an assembly to a method that provides a user interface resource. Any assembly that calls any method having access to a resource 314(b) will cause a host protection exception to result.

A conditional data structure 316 identifies each resource 312(c) that will conditionally be permissible to be accessed by a managed assembly that calls a method providing access to the resource 312(c). The condition upon which the call will be permitted is the identity of the calling assembly. If a managed assembly calls a method providing access to resource 312(c), a Rule Demand (RD) 318(c) will be made upon the calling assembly. If the identity of the calling assembly is trusted such that the RD 318(c) is satisfied, then the call to the method having access to resource 312(c) will be permitted. Otherwise, a host protection exception will result.

Figure 4:
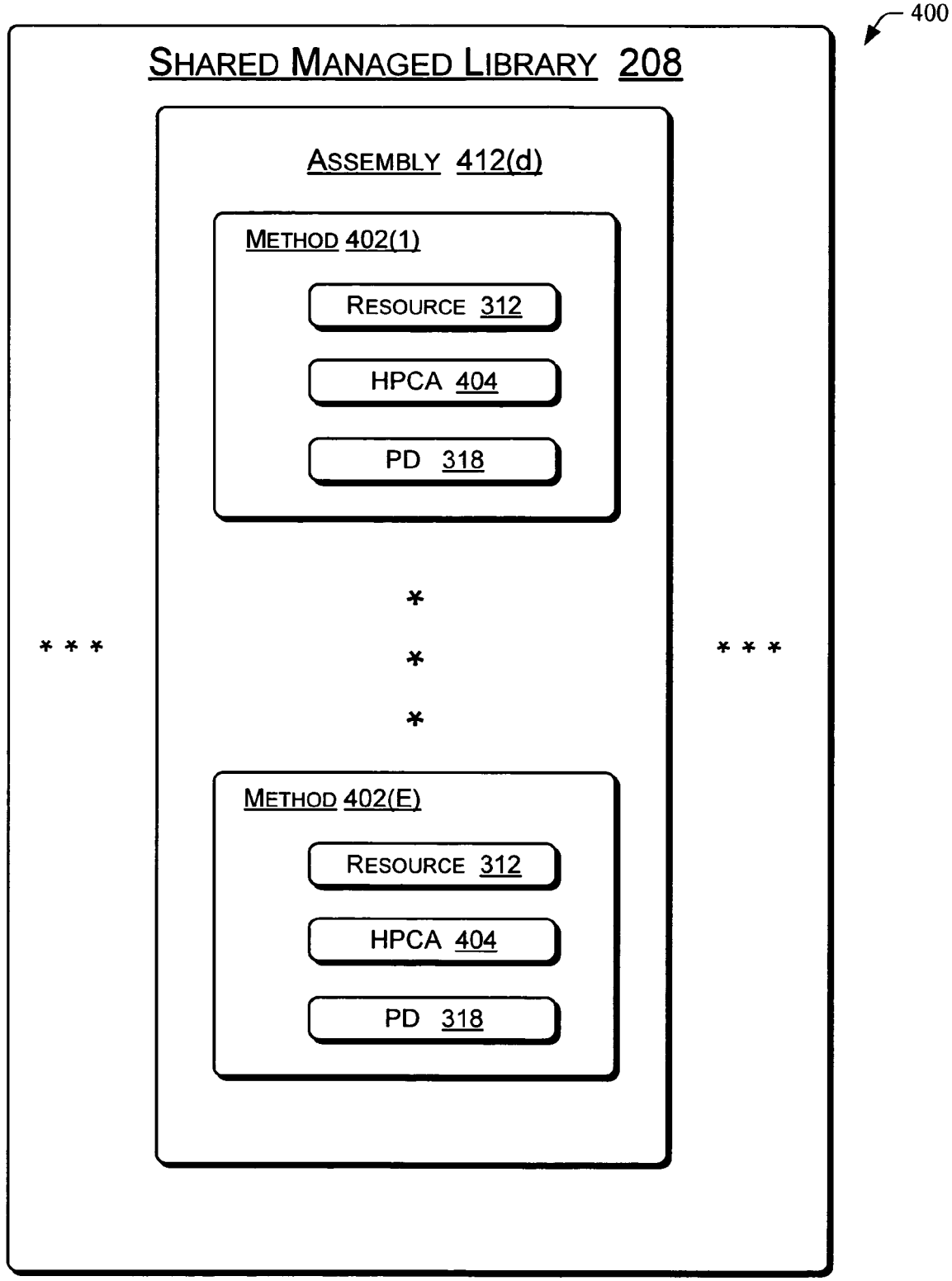
FIG. 4 depicts an exemplary implementation of a shared managed library having a plurality of methods, where each method has a resource identifier, and where one or more of the methods also have a host protection security custom attribute and security permission demand.

FIG. 4 provided an exemplary amplification of shared managed library 208 seen in FIG. 2. One or more managed assemblies 412(1-D) are in shared managed library 208. Each managed assembly 414(d) includes one or more methods 402(1-E). Each method 402(e) has at least one resource 312 to which it provides access. Each method 402(e) may also have a Host Protection Custom Attribute (HPCA) 404 and a Rule Demand (RD) 318. The HPCA 404 represents the subpartitioning of the method 402(e) into one of three categories: always, never, and conditional. These three categories correspond, respectively, to data structures 310, 314, and 316 as seen in FIG. 3. In this instance, the RD 318 contains data quantifying the degree to which the calling assembly's identity must be trusted in the managed code environment 202 before the call to method 404(e) to access resource 312 will be permitted.

When the CLR is initiated within managed environment 200, the computing device 202 accesses the host configuration data structure 302. When the activate data structure 306 indicates that the host is to perform resource checking, then the data in the resource checking data structure 308 is applied to one or more shared managed libraries 208 in the managed code portion of the computing environment 200. To apply resource checking data structure 308 each resource 312 in each of the always 310, never 314, and conditional 316 categories is matched to a method 402(e) in an assembly 412(d) of each shared managed library 208. A match is found when method 404(e) provides access to a resource 312 that corresponds to a resource 312 within one of the always 310, never 314, and conditional 316 categories. With each match of resource 312 in host configuration data structure 302 to resource 312 in shared managed library 208, the HPCA 404 and the RD 318, where applicable, are also associated with the corresponding method 402(e) of the assembly 412(d) of the shared managed library 208. With the completion of the matching and the association of the HPCA 303 and the RD 318, each shared managed library 208 is deemed to have been subpartitioned for hosting rules as further discussed with respect to FIG. 5, and each method 402(e) in each shared managed library 208 is annotated for these hosting rules. These hosting rules will be enforced in the managed environment 200 as long as the CLR is running in the managed environment. As such, any calls from a managed assy & ID 212 to a method 402(e) will subject to these hosting rules.

Figure 5:
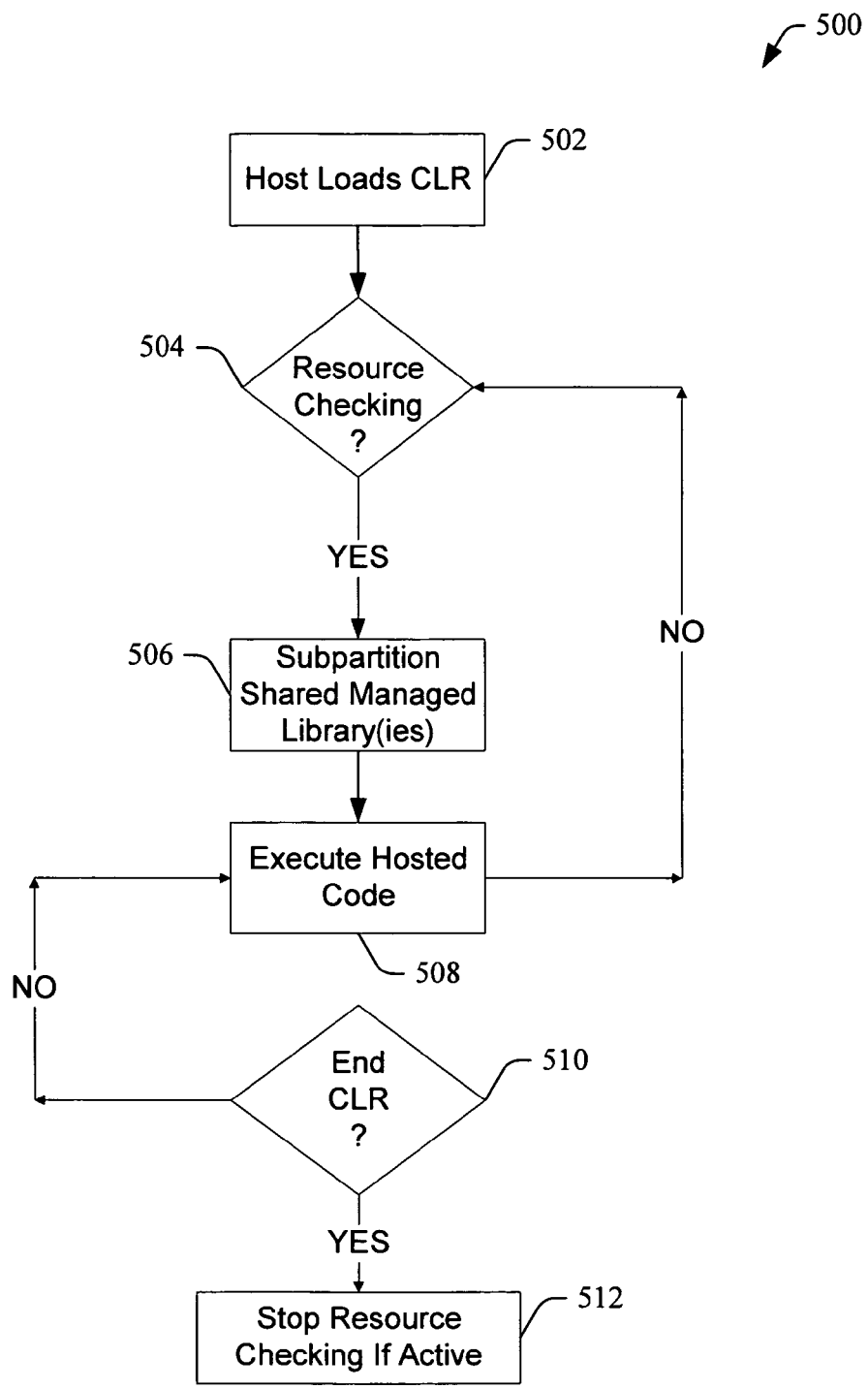
FIG. 5 depicts an implementation of an exemplary process illustrated by a flowchart for subpartitioning a shared managed library based upon hosting rules for a managed environment by use of a host configuration data structure.

FIG. 5 depicts an exemplary process 500 for applying hosting rules to methods in a shared managed library in a managed environment. Process 500 has a block 502 at which a host of the managed environment load a CLR. At block 502, a query is made as to whether the managed environment should enable resource checks to be made on calls made to methods having access to resources. If not, then process 500 moves to block 508. Otherwise, process 500 passes control to block 506 at which one more shared managed libraries are subpartitioned according to hosting rules. The hosting rules can be found by the host in one or more host configuration data structures 302. The host configuration data structures 302, when applied to configure the managed environment, enable the managed environment to perform conditional resource checks when calls are made to methods 402(1-E) providing access to respective resources 312.

At block 508, hosted code is executed in the managed environment. Features of the execution of the hosted code include calls from assemblies to methods providing access to resources. When resource checking has been enabled at block 504, each call to a method is subject to the enforcement of hosting rules applied at block 506. A query 510 determines whether the CLR is terminating. If not, process 510 loops between blocks 508 and 510. Otherwise, process 500 terminates at block 512 at which resource checking, if enabled at block 504, also terminates.

Figure 6:
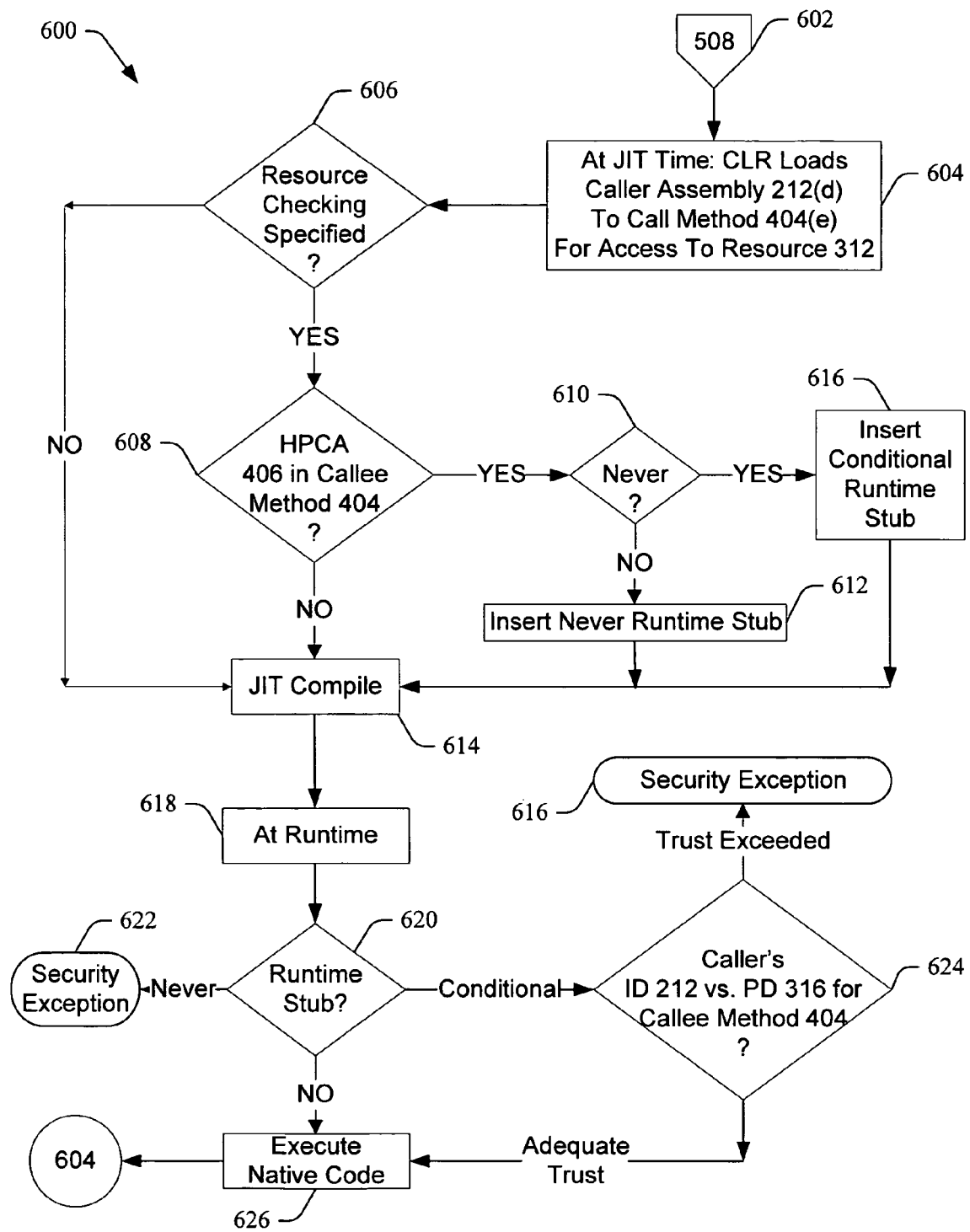
FIG. 6 depicts an implementation of an exemplary process illustrated by a flowchart for processing assemblies that call methods in the subpartitioned shared managed library of FIG. 5, where calls are disallowed to methods from calling assemblies or to methods that are deemed inappropriate for the particular managed environment.

FIG. 6 is a flowchart of an exemplary process 600 for applying conditional rules to calls made by managed code in managed environment 200 seen in FIG. 2. As such, off page connector 508 of FIG. 6 represents block 508 in FIG. 5 for the execution of hosted code in the managed environment 200. While process 600 provides an exemplary implementation for allowing a host of a runtime environment to be configured to use hosting rules to disallow calls to methods from untrusted callers or to methods that are deemed inappropriate for the particular runtime environment, other implementations accomplishing similar functionality but varying order and application of similar concepts are also contemplated.

Process 600 moves control to block 604 which represents the point of Just In Time (JIT) compilation of a managed assy & ID 212. This point marks where the JIT aspect of component 206 compiles a calling managed assy & ID 212 into native code to be executed by the CLR loader of component 206. At JIT time, the CLR loads the caller (e.g., calling) assy & ID 212 that is to make a call to a method 404(e) that provides access to a resource 312. A query 606 determines if resource checking was enabled, as described above at block 504 of FIG. 5. If not, then process 600 passes control to block 614. If resource checking had been enabled, then process 600 passes control to a query 608. Query 608 determines if an HPCA 406 has been associated with the method 404(e) in an assembly 412(d) of shared managed library 208 that is being called by assy & ID 212. If not, then process 600 passes control to block 614. If so, then query 610 determines if the HPCA 406 represents that the call is never allowed. If so, then a runtime stub is generated for association with all or part of the corresponding JIT compiled assy & ID 212, where the runtime stub represents that the call is never allowed to be made for access to a corresponding resource 312 via method 404(e).

If query 610 finds that the HPCA 406 does not represent that the call is never allowed, then by default the HPCA 406 represents that the call is only conditionally allowed and process 600 passes control to block 616. At block 616, a runtime stub is generated for association with all or part of the corresponding JIT compiled assy & ID 212, where the runtime stub represents that the call is conditionally allowed to be made based upon the ID of the assy & ID 212. Process 600 then passes control to block 614.

At block 614, all or part of assy & ID 212 is JIT compiled into native code. The native code is associated with any runtime stub that was generated at block 612 or block 616. Process 600 then proceeds until the runtime for the native code has arrived, as indicated by block 618. At runtime, a query 620 determines if one of the runtime stubs had been associated with the native code. If not, the native code will executed at block 626 where a call can be made to the corresponding method 404(e) to provide access to a respective resource 312. If a runtime stub is found by query 620 that represents the condition that the call should never be permitted, the process 600 will output or throw a host protection exception at terminal block 622. Other conventional processes, not described here, can precede and/or follow the throwing of a host protection exception with respect to a managed environment.

If a runtime stub is found by query 620 that represents the condition that the call might be permitted, then a query 624 determines whether the ID of the calling assy & ID 212 is sufficient to satisfied the RD 316 associated with the corresponding method 404(e). If the ID is not sufficient, the managed calling assy & ID 212 is not sufficiently trusted to be permitted to make its requested call to method 404(e) for access to resource 312, and process 600 will output or throw a host protection exception at terminal block 616. Otherwise, the managed calling assy & ID 212 will be deemed to have sufficient trust to call method 404(e). The corresponding JIT compiled native code will executed at block 626 where a call can be made to the corresponding method 404(e) to provide access to a respective resource 312. Following the execution of the native code in the native code portion of managed environment 202, process 600 passes control back to block 604, as represented by the on-page connector, and processing continues on a described above.

Conclusion.

In hosting environments with strict reliability, robustness and programming model requirements, it may not be permissible for hosted user code to be able to call everything in one or more shared managed libraries. Specifically, accessing methods or classes that otherwise have no security demand placed on them may turn out to violate reliability, robustness or programming model restrictions particular to the hosting environment. For instance, access to an API under some conditions may cause the process to be torn down but may be benign in other hosting scenarios that involve process recycling. Implementations disclosed herein provide features that allows hosts to subset the shared managed libraries and disallow access to any APIs that could violate specific reliability or robustness requirements the host may have. Once such disallowed access may be, for instance, that certain hosted code is not allowed shared state or process creation and/or management.

Implementations allow a host to select a set of reliability and/or robustness constraints in the hosting API that should be protected against. This list of criteria can address the robustness and reliability needs of different hosting scenarios. For every reliability and/or robustness criteria that a host has chosen, the host can select whether no code whatsoever should be able to access the APIs falling into the chosen reliability and/or robustness categories, or whether at least fully trusted code (e.g., core library code or host system code) should be able to access those APIs. All APIs falling into any of the reliability and/or robustness categories that a host may wish to restrict can be marked with a 'Rule Demand', such as is seen by RD 314 in FIGS. 3-4. These Rule Demands will be ignored for any reliability and/or robustness category that has not been selected by a host and will not impact the performance of accessing APIs so annotated.

From a perspective of a common language runtime security model, access from one assembly to another via 'publicly' available APIs is not a security concern so long as code access security permissions are met. Simple cross assembly access when taking place within the same application domain is not normally a protected operation. In a different hosting environment, however, a simple access from one server object (such as an assembly) to another (such as another assembly) might need to be regulated by the hosting environment's specific user identity based permission system, which is not offered by the common language runtime security model. Accordingly, implementations provide ways to intercept cross assembly calls from which a determination can be made as to whether the cross assembly access (e.g., cross server object access) is permissible given the hosting environment's user identity based security settings.

A Computer System

FIG. 7 shows an exemplary computer system that can be used to implement the processes described herein. Computer 742 includes one or more processors or processing units 744, a system memory 746, and a bus 748 that couples various system components including the system memory 746 to processors 744. The bus 748 represents one or more of any of several types of bus structures, including a memory bus or memory controller, a peripheral bus, an accelerated graphics port, and a processor or local bus using any of a variety of bus architectures. The system memory 746 includes read only memory (ROM) 750 and random access memory (RAM) 752. A basic input/output system (BIOS) 754, containing the basic routines that help to transfer information between elements within computer 742, such as during start-up, is stored in ROM 750.

Computer 742 further includes a hard disk drive 756 for reading from and writing to a hard disk (not shown), a magnetic disk drive 758 for reading from and writing to a removable magnetic disk 760, and an optical disk drive 762 for reading from or writing to a removable optical disk 764 such as a CD ROM or other optical media. The hard disk drive 756, magnetic disk drive 758, and optical disk drive 762 are connected to the bus 748 by an SCSI interface 766 or some other appropriate interface. The drives and their associated computer-readable media provide nonvolatile storage of computer-readable instructions, data structures, program modules and other data for computer 742. Although the exemplary environment described herein employs a hard disk, a removable magnetic disk 760 and a removable optical disk 764, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 756, magnetic disk 760, optical disk 764, ROM 750, or RAM 752, including an operating system 770, one or more application programs 772, cache/other modules 774, and program data 776. A user may enter commands and information into computer 742 through input devices such as a keyboard 778 and a pointing device 780. Other input devices (not shown) may include a microphone, joystick, game pad, satellite dish, scanner, or the like. These and other input devices are connected to the processing unit 744 through an interface 782 that is coupled to the bus 748. A monitor 784 or other type of display device is also connected to the bus 748 via an interface, such as a video adapter 786. In addition to the monitor, personal computers typically include other peripheral output devices (not shown) such as speakers and printers.

Computer 742, which can be a server or a personal computer, commonly operates in a networked environment using logical connections to one or more remote computers, such as a remote computer 788. The remote computer 788 may be another server or personal computer, a router, a network PC, a peer device or other common network node, and typically includes many or all of the elements described above relative to computer 742. The logical connections depicted in FIG. 7 include a local area network (LAN) 790 and a wide area network (WAN) 792. Such networking environments are commonplace in offices, enterprise-wide computer networks, intranets, and the Internet.

When used in a LAN networking environment, computer 742 is connected to the local network through a network interface or adapter 794. When used in a WAN networking environment, computer 742 typically includes a modem 796 or other means for establishing communications over the wide area network 792, such as the Internet. The modem 796, which may be internal or external, is connected to the bus 748 via a serial port interface 768. In a networked environment, program modules depicted relative to the personal computer 742, or portions thereof, may be stored in the remote memory storage device. It will be appreciated that the network connections shown are exemplary and other means of establishing a communications link between the computers may be used.

Generally, the data processors of computer 742 are programmed by means of instructions stored at different times in the various computer-readable storage media of the computer. Programs and operating systems are typically distributed, for example, on floppy disks or CDROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a host of a virtual machine environment having one or more methods in a shared managed library, a process for managing calls from a first managed code caller to a first method, the process managing calls based on a hosting rule selected from the following hosting rules each stored in a data structure:
   authorizing, by a computing device, calls from one of a plurality of managed code callers to the first method;
   preventing, by the computing device, calls from one of a plurality of managed code callers to the first method due to the first method's inappropriateness for the virtual machine environment, the first method's inappropriateness being indicated by a query that determines whether a host protection custom attribute (HPCA) is associated with the first method, the query determining from the HPCA that the calls from one of the plurality of managed code callers are to be prevented when the HPCA is associated with the first method; and
   conditionally authorizing, by the computing device, calls from one of a plurality of managed code callers to the first method based on the first method's required level of trust, a level of trust attributed to the first managed code caller, and a rule demand that contains data quantifying a degree of the level of trust, the level of trust attributed to the first managed code caller corresponding to an identity of a provider of the first managed code caller.

2. The process as defined in claim 1, wherein the authorizing and the preventing a call further comprises:
   compiling code corresponding to the first managed code caller into native code; and
   executing the native code corresponding to the first managed code caller while the first managed code caller is making the call to the first method native code.

3. The process as defined in claim 2, further comprising throwing an exception during the executing and while the first managed code caller is making the call to the first method native code when:
   the call is prevented; or
   the level of trust attributed to the first managed code caller is insufficient when compared to a security permission demand assigned to and required by the first method.

4. The process as defined in claim 1, wherein when the call from the first managed code caller is authorized, access is provided by the first method to a protected resource.

5. The process as defined in claim 1, wherein any authorized call provides one or more of the plurality of managed code callers with access to one or more protected resources corresponding to the called method.

6. The process as defined in claim 1, wherein the host compiles the first managed code caller into native code that is executed by a common language runtime via an operating system of the host.

7. The process as defined in claim 1, further comprising configuring each method in the shared managed library with one hosting rule.

8. The process as defined in claim 7, wherein each method is configured prior to any call to any method from any one of the plurality of managed code callers.

9. The process as defined in claim 1, further comprising:
   determining whether the host will use any hosting rule in authorizing a call from any one of the plurality of managed code callers to any of the one or more methods; and
   configuring the one or more methods in the shared managed library with one hosting rule when the determination is affirmative, and not configuring the one or more methods in the shared managed library with one hosting rule when the determination is negative.

10. The process as defined in claim 9, wherein:
    each method in the shared managed library provides access to one or more protected resources; and the host has access to a host configuration data structure comprising:
  resource checking data for making the determination;
  configuration data referencing the one or more protected resources and specifying:
    each protected resource to which access will be authorized to any one of the plurality of managed code callers;
    each protected resource to which access will be prevented to any one of the of managed code callers; and
    each protected resource to which access will be authorized to any one of the plurality of managed code callers having a recognized level of trust satisfying a security permission demand corresponding to the protected resource;
  wherein the process further comprises:
    accessing the host configuration data structure; and
    using the resource checking data in the host configuration data structure to make the determination, wherein the configuring of the one or more methods in the shared managed library with one hosting rule comprises, for each method:
      matching each protected resource to which the method provides access to the corresponding protected resource in the host configuration data structure; and
      for each match, assigning to the method the corresponding configuration data that is associated with the protected resource in the host configuration data structure.

11. The process as defined in claim 1, wherein the managing calls comprises either authorizing or preventing a call from a first managed code caller to a first method based at least in part on the first method.

12. A computer readable storage medium having machine readable instructions stored thereon that, when executed by one or more processors, causes the one or more processors to implement the process as defined in claim 1.

13. A method, comprising:
  intercepting, with a computing device having a host operating in a managed environment, a call from a managed caller to a managed callee; and
  deriving, by the computing device, whether the call is permissible according to the host's prior configuration of a plurality of managed callees, wherein:
    each managed callee provides access to a protected resource; and
    the prior configuration specifies whether to:
    authorize the call to be made;
    prevent the call to be made, the preventing being indicated by a query that determines whether a host protection custom attribute (HPCA) is associated with a method, the query determining from the HPCA that the calls from the managed code caller is to be prevented when the HPCA is associated with the method; or
    conditionally authorize the call to be made based upon the degree to which the host trusts the managed caller, the degree to which the host trusts the managed caller corresponding to an identity of a provider of the managed caller and a rule demand that contains data quantifying the degree to which the host trusts the managed caller;
  providing access, by the computing device, to the protected resource to the managed caller when the call is permissible; and
  preventing access, by the computing device, to the protected resource to the managed caller when the call is not permissible.

14. The method as defined in claim 13, wherein the host compiles the managed caller into native code that is executed by a common language runtime via an operating system of the host.

15. The method as defined in claim 14, further comprising throwing an exception when:
  the managed caller attempts to make a call that is prevented; or
  the managed caller attempts to make a call when the degree to which the host trusts the managed caller is insufficient.

16. The method as defined in claim 13, further comprising, prior to the intercepting:
  determining whether the host will perform the deriving;
  performing the intercepting and the deriving if the determination is affirmative; and
  preventing the intercepting and the deriving if the determination is negative.

17. The method as defined in claim 16, wherein:
  the host has access to a host configuration data structure comprising:
    resource checking data for making the determination; and
    configuration data sufficient for the host's prior configuration of the plurality of managed callees;
  the determining whether the host will make the derivation comprises accessing, with the host, the resource checking data in the host configuration data structure.

18. A computer readable storage medium having machine readable instructions stored thereon that, when executed by one or more processors, causes the one or more processors to implement the method as defined in claim 13.

19. An apparatus, comprising:
  virtual machine means, in a managed code portion including a plurality of methods in a shared managed library, for operating a plurality of managed code callers in the managed code portion;
  execution engine means, in a native code portion, for the virtual machine means;
  means, in a native code portion, for providing a runtime engine in an operating system; and
  means for authorizing or preventing a call from a first one of the plurality of managed code callers to a first one of the plurality of methods based upon a configuration of the first method with a hosting rule selected from a group comprising of:
    authorizing calls from any one of the plurality of managed code callers to the first method;
    preventing calls from any one of the plurality of managed code callers to the first method due to the first method's inappropriateness for the runtime environment, the first method's inappropriateness being indicated by a query that determines whether a host protection custom attribute (HPCA) is associated with the first method, the query determining from the HPCA that the calls from any one of the plurality of managed code callers are to be prevented when the HPCA is associated with the first method; and
    conditionally authorizing calls from any one of the plurality of managed code callers to the first method based upon:
      a method's required level of trust; and
      a level of trust attributed to the managed code caller, the level of trust attributed to the managed code caller being based upon an identification of the provider of the managed code caller and a rule demand that contains data quantifying a degree of the level of trust.

20. The apparatus as defined in claim 19, further comprising:
   means for compiling each one of the plurality of managed code callers from an intermediate language code and metadata into native code;
   means for loading the native code with a Common Language Runtime (CLR) loader in the native code portion to load the compiled native code; and
   means for executing the compiled native code in the native code portion causing the managed code caller to call one method.

21. The apparatus as defined in claim 19, further comprising means for throwing an exception when one of the plurality of managed code callers attempts to make a prevented call during the execution of the compiled native code corresponding to any one of the plurality of managed code callers.

22. The apparatus as defined in claim 19, wherein the managed code portion further comprises one or more files associated with user code that, when compiled into an intermediate language code and metadata generated by a language compiler, are represented by one or more of the plurality of managed code callers.

23. The apparatus as defined in claim 19, wherein the execution engine means in the native code portion further comprises a compiler to compile each one of the plurality of managed code callers into native code for execution by the native code portion.

24. The apparatus as defined in claim 19, wherein the execution engine means in the native code portion further comprises:
   a Just In Time (JIT) compiler to compile each one of the plurality of managed code callers into native code; and
   a CLR loader to load the compiled native code for execution by the native code portion.

25. A computing device, comprising:
   a managed code portion including:
      one or more methods in a shared managed library;
      one or more assemblies placed in respective application domains for execution; and
      a virtual machine;
   a native code portion including:
      an execution engine for the virtual machine; and
      an operating system under the execution engine;
   logic configured to:
      intercept a call from one assembly to one method;
      derive whether the call is permissible according to a prior configuration of the one or more methods, wherein:
         each method provides access to a protected resource; and
         the prior configuration specifies whether to:
            authorize the call to be made;
            prevent the call to be made, the preventing being indicated by a query that determines whether a host protection custom attribute (HPCA) is associated with the one or more methods, the query determining from the HPCA that the call is to be prevented when the HPCA is associated with the one or more methods;
            conditionally authorize the call to be made based upon the degree to which the one assembly is trusted by the computing device, the degree to which the computing device trusts the one assembly corresponds to an identity of a provider of the one assembly and a rule demand that contains data quantifying the degree to which the one assembly is trusted by the computing device;
      provide to the one assembly access to the corresponding protected resource when the call is permissible; and
      prevent access to the one assembly to the corresponding protected resource when the call is not permissible.

26. The computing device as defined in claim 25, wherein the computing device compiles the one assembly into native code that is executed by a common language runtime via the operating system.

27. The computing device as defined in claim 26, further comprising throwing an exception when:
   the prior configuration specifies to attempt to make the call that is prevented; or
   the prior configuration specifies to attempt to make the call when the degree to which the computing device trusts the one assembly is insufficient.

28. The computing device as defined in claim 25, further comprising, prior to the intercepting:
   determining whether the computing device will make the derivation; performing the intercepting and the deriving if the determination is affirmative; and
   not performing the intercepting and the deriving if the determination is negative.

29. The computing device as defined in claim 28, wherein:
   the computing device has access to a host configuration data structure comprising:
      resource checking data for making the determination; and
      configuration data sufficient for the computing device's prior configuration of the one of more methods;
   the determining whether the computing device will make the derivation comprises accessing, with the computing device, the resource checking data in the host configuration data structure.

30. The computing device as defined in claim 25, wherein the logic is further to receive intermediate language code and metadata generated by a language compiler to form the one or more assemblies for placement within respective application domains for execution.

31. The computing device as defined in claim 30, wherein the intermediate language code and the metadata generated by the language compiler are generated from one or more files each having a file type and each being associated with user code.

32. The computing device as defined in claim 25, wherein the execution engine further comprises:
   a JIT complier to compile the assemblies into native code; and
   a CLR loader to load the compiled native code for execution in the native code portion.

33. A host operating in a managed environment, comprising:
   logic, of a computing device, for configuring each of a plurality of managed callees, each providing access to a protected resource, with a configuration that:
      authorizes a call to be made to each of the plurality of managed callees for access to the corresponding protected resource;
      prevents a call to be made to each of the plurality of managed callees for access to the corresponding protected resource, the preventing being indicated by a query that determines whether a host protection custom attribute (HPCA) is associated with one or more methods, the query determining from the HPCA that the call is to be prevented when the HPCA is associated with the one or more methods; or conditionally authorizes a call to be made to each of the plurality of managed callees for access to the corresponding protected resource based upon a degree of trust of the host for one of a plurality of managed callers and a rule demand that contains data quantifying the degree of trust of the one of the plurality of managed callers, the degree of trust of the host for the one of the plurality of managed callers corresponding to an identity of a provider to the host;

logic, of the computing device, for intercepting a call from a particular one of the plurality of managed callers to a particular one of the plurality of managed callees;

logic, of the computing device, after intercepting the call, for determining whether the call is permissible according to the configuration of the particular one of the plurality of managed callees; and logic, of the computing device, after determining whether the call is permissible, for either providing access to the particular one of the plurality of managed callers to the protected resource when the call is permissible or preventing access to the particular one of the plurality of managed callers to the protected resource when the call is not permissible.

* * * * *